US011841190B2

United States Patent
Huang et al.

(10) Patent No.: US 11,841,190 B2
(45) Date of Patent: Dec. 12, 2023

(54) BIOMASS COMBUSTION SYSTEM FOR CERAMIC ROLLER KILN AND BIOMASS COMBUSTION METHOD

(71) Applicant: GUANGZHOU INSTITUTE OF ENERGY TESTING, Guangzhou (CN)

(72) Inventors: Kuo Huang, Guangzhou (CN); Yuanming Zhang, Guangzhou (CN); Xiaozhou Liu, Guangzhou (CN); Qilun Lu, Guangzhou (CN); Chao Feng, Guangzhou (CN); Guoyu Chen, Guangzhou (CN); Liling Chen, Guangzhou (CN); Wei Xiao, Guangzhou (CN); Huixuan Liang, Guangzhou (CN)

(73) Assignee: GUANGZHOU INSTITUTE OF ENERGY TESTING, Guangzhou (CN)

( * ) Notice: Subject to any disclaimer, the term of this patent is extended or adjusted under 35 U.S.C. 154(b) by 0 days.

(21) Appl. No.: 18/060,637

(22) Filed: Dec. 1, 2022

(65) Prior Publication Data
US 2023/0204287 A1 Jun. 29, 2023

(30) Foreign Application Priority Data
Dec. 1, 2021 (CN) .......................... 202111452964.6

(51) Int. Cl.
*F27B 9/40* (2006.01)
*F27B 9/12* (2006.01)
(Continued)

(52) U.S. Cl.
CPC ................ *F27B 9/12* (2013.01); *C10J 3/723* (2013.01); *C10J 3/82* (2013.01); *F27B 9/029* (2013.01);
(Continued)

(58) Field of Classification Search
CPC ........ C10J 2300/0916; C10J 2300/0953; C10J 3/723; C10J 3/82; F27B 9/12;
(Continued)

(56) References Cited

U.S. PATENT DOCUMENTS

| 4,527,974 A | 7/1985 | Carraroli et al. |
| 5,087,271 A * | 2/1992 | Stellaccio ................ C10J 3/723 48/212 |

(Continued)

FOREIGN PATENT DOCUMENTS

| CN | 201502867 U * | 6/2010 |
| CN | 105333728 A | 2/2016 |

(Continued)

OTHER PUBLICATIONS

Lisa Fang et al., Economic analysis of ceramic kiln fuel, Energy Conservation, vol. 5, 2014, pp. 28-33.

*Primary Examiner* — Gregory A Wilson

(57) ABSTRACT

A biomass combustion system for ceramic roller kiln, including a roller kiln including a preheating section, a combustion section and a cooling section; a biomass gasifier with a feed port, a first gas inlet, a second gas inlet and an gas outlet; a fuel manifold; and a pentane gasification device connected to the fuel manifold. The biomass or biomass waste is fed through the feed port. The gas outlet is connected to the fuel manifold through a heat exchanger. The premixer is configured to mix part of the hot air discharged from the cooling section with a mixture of biomass gas and gaseous pentane transported by the fuel manifold to obtain an air-fuel mixture, and distribute the mixture to the combustion section through burners. A biomass combustion process is also provided.

9 Claims, 6 Drawing Sheets

(51) Int. Cl.
*C10J 3/72* (2006.01)
*C10J 3/82* (2006.01)
*F27B 9/02* (2006.01)

(52) U.S. Cl.
CPC ......... *F27B 9/40* (2013.01); *C10J 2300/0916* (2013.01); *C10J 2300/0953* (2013.01); *F27B 2009/122* (2013.01); *F27B 2009/124* (2013.01)

(58) Field of Classification Search
CPC ...... F27B 9/029; F27B 9/40; F27B 2009/122; F27B 2009/124
See application file for complete search history.

(56) References Cited

U.S. PATENT DOCUMENTS

| | | | | |
|---|---|---|---|---|
| 7,452,392 B2 * | 11/2008 | Nick | ......................... | C10J 3/14 |
| | | | | 422/240 |
| 8,490,416 B2 * | 7/2013 | Nemer | ..................... | F27D 9/00 |
| | | | | 62/63 |
| 2023/0088250 A1 * | 3/2023 | DeBruin | ................ | B29B 17/04 |
| | | | | 241/47 |

FOREIGN PATENT DOCUMENTS

| | | | |
|---|---|---|---|
| CN | 105829819 A | | 8/2016 |
| CN | 208901891 U | | 5/2019 |
| DE | 102009018691 A1 | | 10/2010 |
| EP | 3767214 A1 | | 1/2021 |
| GB | 2119080 A | | 11/1983 |
| JP | 2007024374 A | | 2/2007 |

\* cited by examiner

BIOMASS COMBUSTION SYSTEM FOR CERAMIC ROLLER KILN AND BIOMASS COMBUSTION METHOD

CROSS-REFERENCE TO RELATED APPLICATIONS

This application claims the benefit of priority from Chinese Patent Application No. 202111452964.6, filed on Dec. 1, 2021. The content of the aforementioned application, including any intervening amendments thereto, is incorporated herein by reference in its entirety.

TECHNICAL FIELD

This application relates to energy conservation and emission reduction of ceramic roller kiln, and more particularly to a biomass combustion system for a ceramic roller kiln and a biomass combustion method.

BACKGROUND

Natural gas is considered a high calorific and environmentally-friendly energy source, and has been widely consumed as fuel for ceramic roller kilns. However, the natural gas is expensive, and will easily make the combustion temperature excessively high due to the high calorific value. Moreover, the combustion process is generally accompanied by excessive nitrogen oxides (NOx) emission. The waste heat of the ceramic roller kiln is underutilized, resulting in high energy consumption. To solve the existing problems, biomass gas, which is generated from the biomass or biomass waste by using the biomass gasifier, is employed, which is much cheaper than the natural gas, effectively reducing the operating cost of the ceramic roller kiln. In addition, the biomass gas has a relatively lower calorific value, which contributes to decrease in the generation of the nitrogen oxides (NOx). However, the low calorific value limits the application of the biomass gas in the sintering of ceramic products. Therefore, how to effectively integrate the biomass gasification with the ceramic roller kiln has become a problem urgently required to be solved.

SUMMARY

An objective of this application is to provide a biomass combustion system for a ceramic roller kiln and a biomass combustion method to overcome the defects in the prior art, where the high-temperature low-oxygen flue gas and hot air emitted from the ceramic roller kiln is employed as a gasification agent in the biomass gasifier, and the gasified biomass is premixed with gaseous pentane and hot air recovered for the ceramic roller kiln and fed to the ceramic roller kiln for combustion, improving the gasification efficiency of the biomass gasifier and reducing the emission of nitrogen oxides. In addition, a mixture of the gaseous pentane with a relatively high calorific value and the biomass gas having a relatively low calorific value has a calorific value close to that of the natural gas, such that it does not need to replace the original natural gas burner in the ceramic roller kiln.

Technical solutions of this application are described as follows.

In a first aspect, this application provides a biomass combustion system for a ceramic roller kiln, comprising: a roller kiln, a biomass gasifier, a pentane gasification device and a fuel manifold;

the biomass gasifier is provided with a feed port, a first gas inlet, a second gas inlet and a gas outlet; the feed port is configured for feeding of biomass or biomass waste; and the gas outlet is connected to the fuel manifold through a heat exchanger;

the pentane gasification device is connected to the fuel manifold;

the roller kiln is provided with a preheating section, a combustion section and a cooling section; the fuel manifold is communicated with the combustion section through a first pipe, and the first pipe is provided with a premixer; the cooling section is connected to the premixer through a second pipe; a first part of hot air discharged from the cooling section is transported to the premixer, and a second part of the hot air discharged from the cooling section is transported to the second gas inlet; the hot air discharged from the cooling section has a temperature higher than ambient temperature; the premixer is configured to mix the first part of the hot air discharged from the cooling section with a mixture of biomass gas and gaseous pentane transported by the fuel manifold to obtain an air-fuel mixture, and feed the air-fuel mixture to the combustion section through a plurality of burners; a first part of flue gas discharged from the preheating section is configured to provide heat source for the heat exchanger; a second part of the flue gas is configured to gasify liquid pentane in the pentane gasification device; and a third part of the flue gas is transported to the first gas inlet.

In an embodiment, pipes connected to the premixer are each provided with a fire arrestor for preventing backfire; the fire arrestor has an impeller structure; the impeller structure comprises a blade mounting bracket and a plurality of blades; the plurality of blades are arranged evenly spaced apart on the blade mounting bracket along a circumferential direction; each of the plurality of blades is inclined with respect to a surface of the blade mounting bracket; the plurality of blades each have a plurality of holes; and there is no gap between vertical projections of adjacent blades.

In an embodiment, the heat exchanger is a jet-flow heat exchanger; the jet-flow heat exchanger has two pipelines staggered with each other; one of the two pipelines is configured for feeding of biomass gas to be heated, and has an inner pipeline and an outer pipeline; wherein the inner pipeline and the outer pipeline are arranged concentrically; the other of the two pipelines is configured for feeding of recovered flue gas; wherein the biomass gas to be heated enters the inner pipeline, and passes through a plurality of holes on the inner pipeline to be in contact with an inner surface of the outer pipeline; and the recovered flue gas passes through the outer pipeline to perform heat transfer to heat the biomass gas to be heated.

In an embodiment, the pentane gasification device is provided with a pentane heater; the pentane heater comprises a gas feed pipeline and a liquid pentane storage vessel; the liquid pentane storage vessel is configured to store the liquid pentane; the liquid pentane storage vessel is provided with an outlet; the gas feed pipe comprises a plurality of branches extending into the liquid pentane storage vessel; and the gas feed pipe is configured to feed the second part of the flue gas discharged from the preheating section to gasify the liquid pentane to obtain the gaseous pentane, and carry the gaseous pentane to the premixer.

In an embodiment, the biomass combustion system further comprises a control system; the roller kiln is provided with a temperature feedback system; the temperature feedback system is configured to collect a temperature in the roller kiln, and feed temperature information to the control system; the control system is configured to control supplies of the hot air discharged from the cooling section and biomass gas transported by the fuel manifold according to the temperature information fed back by the temperature feedback system.

In an embodiment, a fuel gas main distribution pipe is provided at downstream of the premixer along a gas flow direction, and an end of the fuel gas main distribution pipe is provided with the plurality of burners; and the premixer is also configured to distribute the air-fuel mixture to the fuel gas main distribution pipe at two sides of the roller kiln, and lead the air-fuel mixture to the plurality of burners.

In an embodiment, the second pipe is provided with a first solenoid valve; the fuel manifold is connected to the premixer through a third pipe, and the third pipe is provided with a second solenoid valve; and the fuel gas main distribution pipe is provided with a third solenoid valve.

In an embodiment, the pentane gasification device is connected to a first chimney, and the first chimney is configured to allow the first part of the flue gas to be discharged from the pentane gasification device; and the heat exchanger is connected to a second chimney, and the second chimney is configured to allow the second part of the flue gas to be discharged from the heat exchanger.

In a second aspect, this application provides a gasification and hybrid combustion method of biomass and pentane using the biomass combustion system mentioned above, comprising:
  heating biomass gas generated by the biomass gasifier from a first temperature to a second temperature;
  heating the liquid pentane into the gaseous pentane; and
  premixing the gaseous pentane with heated biomass gas, followed by distribution to the combustion section.

In an embodiment, the gasification and hybrid combustion method, further comprising:
  recovering the third part of the flue gas discharged from the preheating section to the first gas inlet; and
  recovering the first part of the hot air discharged from the cooling section to the second gas inlet to be used as combustion-supporting air;
  wherein the biomass gas is heated by the second part of the flue gas discharged from the preheating section from the first temperature to the second temperature; and the liquid pentane is heated by the first part of the flue gas into the gaseous pentane.

Compared with the prior art, this application has the following beneficial effects.

1. The 260° C. hot air and the 450° C. high-temperature flue gas are together used as the gasification agent, which allows high gasification efficiency, and low $NO_x$ emission, facilitating energy saving and environmental protection.

2. The multi-stage waste heat recovery and utilization technology is adopted herein. Some of the 260° C.-air discharged from the cooling section of the roller kiln is used as the gasification agent of the biomass, and the rest is used as the combustion-supporting air, leading to relatively high energy utilization rate. A first part of the 450° C. high-temperature flue gas discharged from the preheating section of the roller kiln is used as the gasification agent of the biomass; a second part of the 450° C. high-temperature flue gas is used for preheating the biomass gas; and a third part of the 450° C. high-temperature flue gas is used to gasify the pentane. After cooled to about 200° C., the flue gas is discharged through the chimney, such that the energy utilization efficiency of the ceramic roller kiln is greatly improved.

3. The liquid pentane is gasified by the waste heat of the flue gas discharged from the roller kiln, and the pentane gas is mixed with the biomass gas to replace the traditional natural gas, reducing the operating cost and overcoming the deficiency caused by the low calorific value of the biomass gas.

4. The premixed combustion technology is adopted herein. Each zone is installed with a premixer to fully mix the fuel gas and hot air, and then the mixture is distributed to the fuel gas main distribution pipe at two sides of the roller kiln, and then introduced to the plurality of burners. The fuel gas pipe and the hot air pipe are each provided with an electric gas damper to accurately adjust the flow rate. Regardless of the rate of the gas flow entering the burner, the air-fuel ratio remains unchanged, eliminating the oxygen deficiency and oxygen excess, and greatly improving the combustion efficiency of the roller kiln.

5. The fuel gas and the combustion-supporting air are under fully automatic interlocking control, such that when the fuel gas is shut off, the combustion-supporting air is shut off, which not only enables the prolonged heat preservation inside the roller kiln and reduces the fuel consumption, but also can automatically adjust the flow rate of the fuel gas according to the kiln temperature to maintain the kiln temperature constant, thereby improving the thermal efficiency.

BRIEF DESCRIPTION OF THE DRAWINGS

In order to clearly illustrate the technical solutions in the embodiments of this application, the drawings that need to be used in the description of the embodiments are briefly described below. Obviously, illustrated in the drawings are merely some embodiments of this application. For those of ordinary skill in the art, other drawings can be obtained based on these drawings without paying creative effort.

DETAILED DESCRIPTION OF EMBODIMENTS

Figure 1:
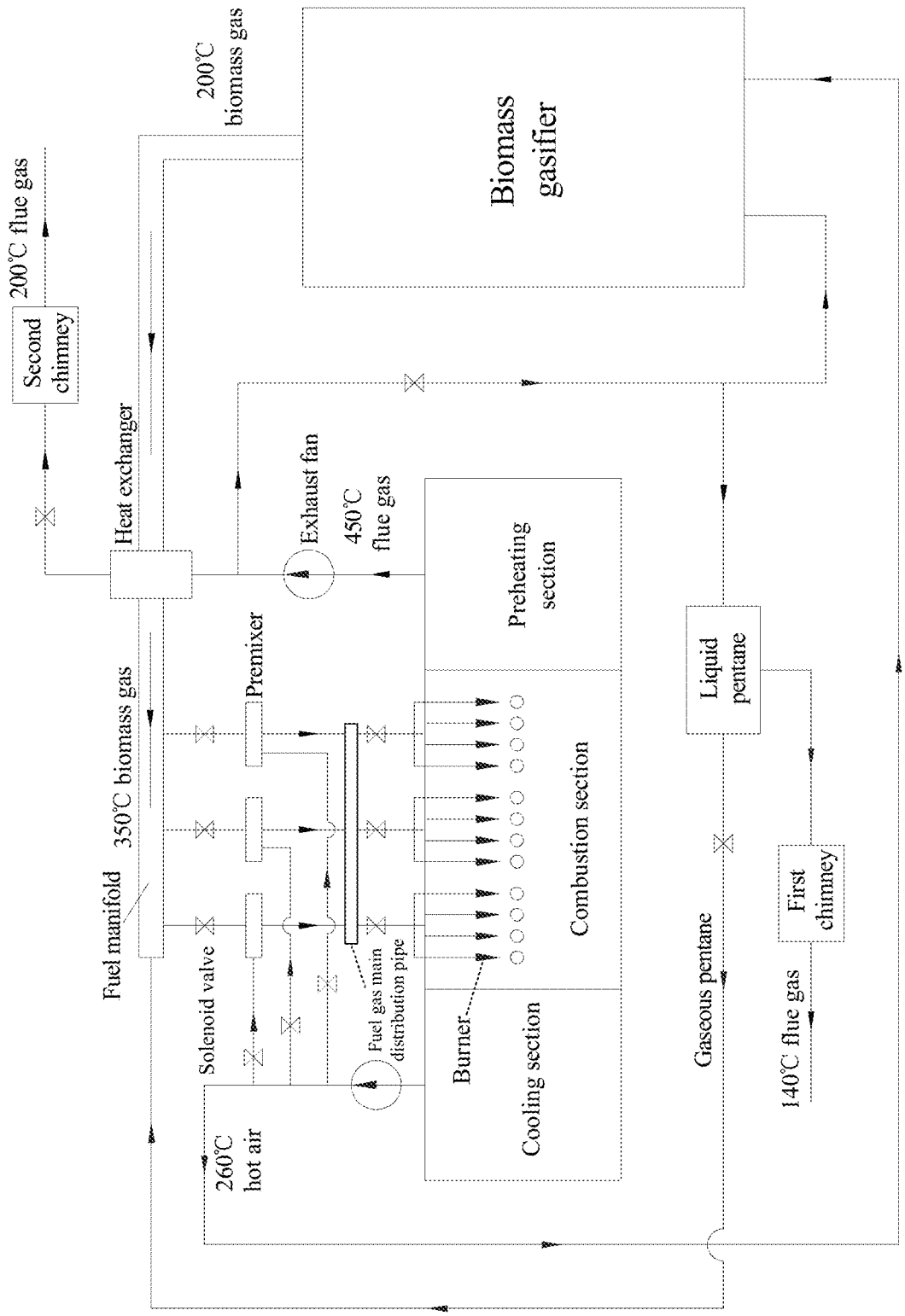
FIG. 1 structurally shows a biomass combustion system for ceramic roller kiln according to an embodiment of this application.

This application will be described in detail below with reference to the accompanying drawings and embodiments to explain the technical solutions clearly and completely. Obviously, described below are merely some embodiments of this application, and are not intended to limit this application. Other embodiments obtained by those of ordinary skill in the art based on the embodiments provided herein without paying creative effort shall fall within the scope of the present disclosure defined by the appended claims.

It should be noted that terms such as "first" and "second" used in the description, claims and the accompany drawings are merely used to distinguish similar objects, and cannot be understood as indicating or implying the specific order. It should be understood that such terms are interchangeable where appropriate, so that embodiments provided herein can be implemented in a sequence other than those illustrated or described herein. In addition, as used herein, the terms "comprise" and "have" and any variations thereof are intended to cover non-exclusive inclusion, for example, a process, method, system, product or device comprising a series of steps or units is not necessarily limited to those steps or units that are expressly listed herein, but may include other steps or units that are not expressly listed herein or steps or units inherent to the process, method, product or apparatus.

It is to be understood that the orientation or positional relationships indicated by the terms such as "center", "longitudinal", "lateral", "length", "width", "thickness", "top", "bottom", "front", "rear", "left", "right", "vertical", "horizontal", "top", "bottom", "inner", "outer", "clockwise", "counterclockwise", "axial", and "radial", are based on the orientation or positional relationship shown in the accompanying drawings, and are merely intended to facilitate and simplify the description of this application, rather than indicating or implying that the referred device or unit must have a specific orientation, or is constructed and operated in a particular orientation, and thus should not to be construed as a limitation of this application.

In this application, unless otherwise specified, "a plurality of" means at least two, such as two, three, etc. In addition, unless otherwise specified, the terms, such as "installation", "linkage" and "connection", should be understood broadly, for example, it may be a fixed connection, a detachable connection, or an integral connection; it may be a mechanical connection or an electrical connection; it can be a direct connection, an indirect connection through an intermediate medium, or an internal communication between two components. For those of ordinary skill in the art, the meaning of the above terms in this application can be understood in specific situations.

In this application, unless otherwise specified, the "a first feature is "above" or "below" a second feature" may mean that the first feature is in direct contact with the second feature, or in indirect contact with the second feature through an intermediate medium. "The first feature is "above", "over" or "on" the second feature" is not limited to that "the first feature is directly above the second feature", or merely means that the first feature is higher than the second feature. "The first feature is "below", "under" or "underneath" the second feature" is not limited to that "the first feature is directly below the second feature", or merely means that the first feature is lower than the second feature.

Figure 2:
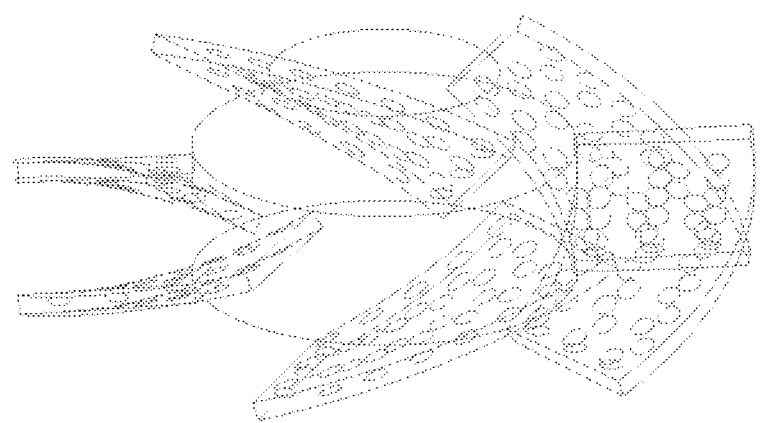
FIG. 2 schematically shows structure of a fire arrestor according to an embodiment of this application.
Figure 3:
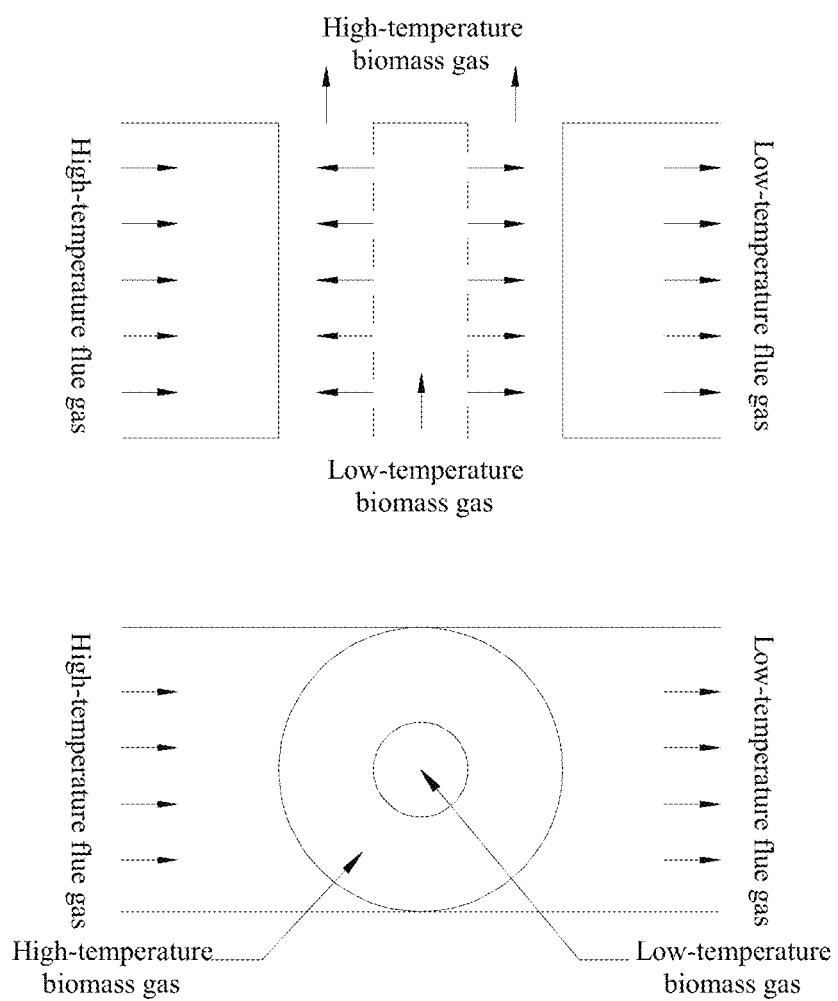
FIG. 3 schematically shows structure of a jet-flow heat exchanger according to an embodiment of this application.
Figure 4:
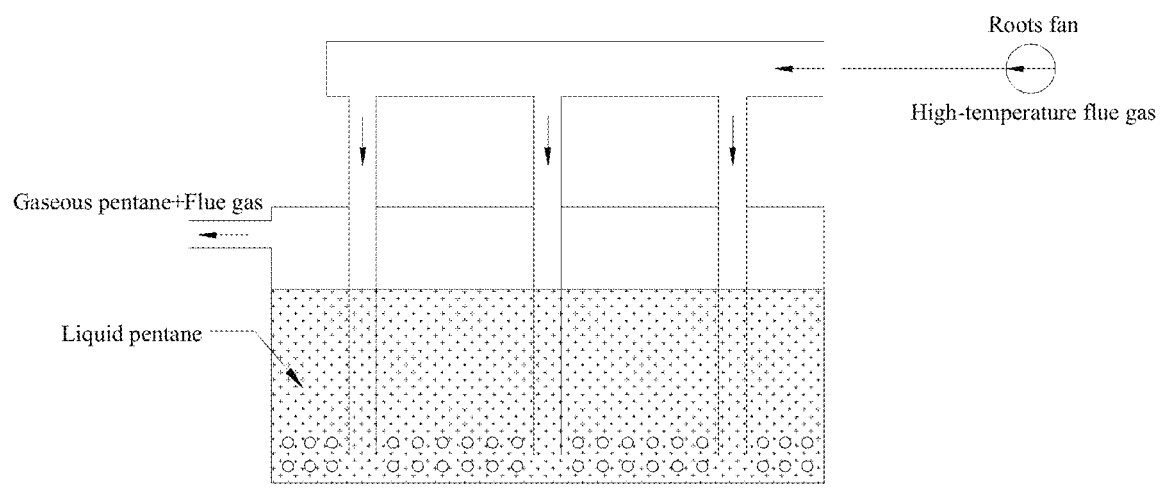
FIG. 4 schematically shows structure of a pentane heater according to an embodiment of this application.
Figure 5:
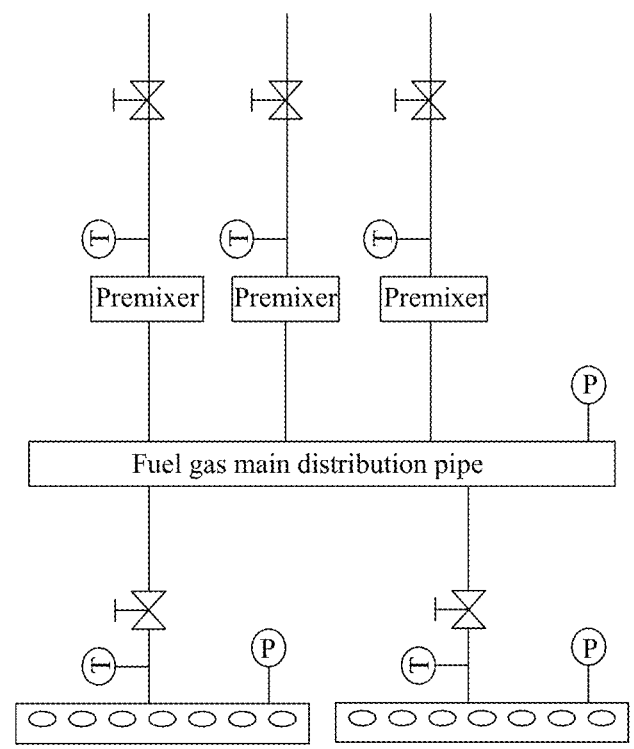
FIG. 5 schematically shows zoned centralized premixing and quantitative measurement according to an embodiment of this application.
Figure 6:
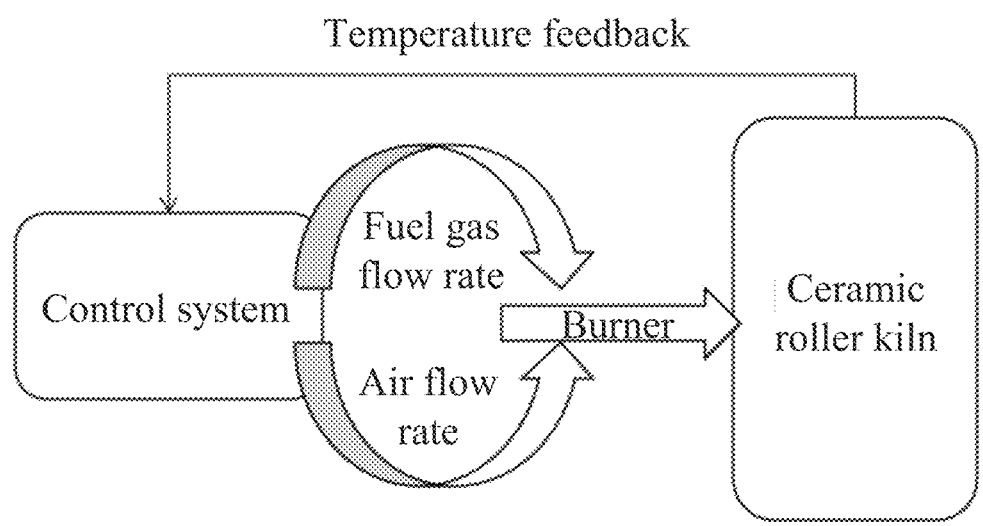
FIG. 6 is a schematic diagram of an automatic control system for fuel and air supply according to an embodiment of this application.

Referring to FIGS. 1 to 6. FIG. 1 structurally shows a biomass combustion system for ceramic roller kiln according to an embodiment of this application. FIG. 2 schematically shows structure of a fire arrestor according to an embodiment of this application. FIG. 3 schematically shows structure of a jet-flow heat exchanger according to an embodiment of this application. FIG. 4 schematically shows structure of a pentane heater according to an embodiment of this application. FIG. 5 schematically shows zoned centralized premixing and quantitative measurement according to an embodiment of this application. FIG. 6 is a schematic diagram of an automatic control system for fuel and air supply according to an embodiment of this application.

In this application, the high-temperature and low-oxygen flue gas and hot air discharged from the ceramic roller kiln are together used as the gasification agent in the biomass gasifier (while the traditional biomass gasifier uses cold air as the gasification agent, leading to low gasification efficiency), which not only enhances the gasification efficiency of the biomass gasifier, but also reduces the emission concentration of nitrogen oxides from the kiln. The liquid pentane and the biomass gas are heated by the waste heat of the high-temperature flue gas discharged from the ceramic roller kiln, so that the pentane is gasified into gaseous pentane, and the gaseous pentane is uniformly mixed with the biomass gas in the fuel manifold, effectively improving the calorific value of the fuel gas to reach the calorific value of natural gas. A premixed combustion method is used herein, and the biomass gas is pre-heated by high-temperature flue gas. After being preheated to 350° C. by the flue gas, the biomass gas is uniformly mixed with the gaseous pentane in the fuel manifold, and fully mixed with the hot air in the premixer in proportion before feeding the gas burner. Since both hot air and fuel gas are at high temperature, the comprehensive utilization efficiency of energy is greatly improved. In addition, the thermal efficiency of premixed combustion is much higher than that of diffusion combustion, which will further reduce the fuel consumption.

Provided herein is a biomass combustion system for a ceramic roller kiln, including a roller kiln, a biomass gasifier, a pentane gasification device and a fuel manifold. The biomass gasifier is provided with a feed port, a first gas inlet, a second gas inlet and an gas outlet. The feed port is configured for feeding of biomass or biomass waste. The gas outlet is connected to the fuel manifold through a heat exchanger. The pentane gasification device is connected to the fuel manifold. The roller kiln is provided with a preheating section, a combustion section and a cooling section. The fuel manifold is communicated with the combustion section through a first pipe, and the first pipe is provided with a premixer. The cooling section is connected to the premixer through a second pipe. A first part of hot air discharged from the cooling section is transported to the premixer, and a second part of the hot air discharged from the cooling section is transported to the second gas inlet. The hot air discharged from the cooling section has a temperature higher than ambient temperature. The premixer is configured to mix the first part of the hot air discharged from the cooling section with a mixture of biomass gas and gaseous pentane transported by the fuel manifold to obtain an air-fuel mixture, and feed the air-fuel mixture to the combustion section through a plurality of burners. A first part of flue gas discharged from the preheating section is configured to provide heat source for the heat exchanger. A second part of the flue gas is configured to gasify liquid pentane in the pentane gasification device, and a third part of the flue gas is transported to the first gas inlet.

In an embodiment, the biomass or biomass waste enters from an upper part of the biomass gasifier, and the 450° C. high-temperature low-oxygen flue gas discharged from the preheating section and the 260° C.-air discharged from the cooling section enter from a lower part of the biomass gasifier. The temperature of the biomass gas at the gas outlet of the gasifier can reach 200° C., such that the gasification efficiency is greatly improved. The biomass gas generated from the gasifier is extracted from the upper part of the gasifier to enter the heat exchanger that is arranged above the kiln, and exchange heat with the 450° C. high-temperature low-oxygen flue gas discharged from the preheating section to be heated to reach above 350° C., followed by entering the fuel manifold. After releasing heat, the flue gas is cooled to 200° C. and discharged to the second chimney. A rest of the flue gas enters the pentane gasification device to gasify the liquid pentane through the waste heat to obtain gaseous pentane. After releasing heat, the flue gas is cooled to 140°

C., and discharged to the first chimney. The gaseous pentane enters the fuel manifold for fully mixing with the biomass gas to form a fuel gas with high calorific value. Because the calorific value of pentane is much higher than that of natural gas, the calorific value of the fuel gas is close to that of the natural gas. In order to improve the combustion efficiency, the 260° C. hot air discharged from the cooling section of the ceramic roller kiln is used as the combustion-supporting air, and the premixed combustion method is used herein. Ceramic roller kilns generally have more than 20 combustion zones (only three combustion zones are schematically drawn in the accompanying drawings). Each combustion zone is centrally provided with a premixer. Referring to an embodiment shown in FIG. 1, the preheated high-temperature fuel gas and the hot air are fully mixed in the premixer to obtain the air-fuel mixture, distributed the air-fuel mixture to a fuel gas main distribution pipe at two sides of the roller kiln, and lead the air-fuel mixture to the plurality of burners. The fuel gas pipe and the hot air pipe are each provided with an electric gas damper for a simple measurement device to accurately adjust the flow rate. Regardless of the rate of the flow entering the burner, the air-fuel ratio remains unchanged, completely eliminating the oxygen deficiency and oxygen excess, and greatly improving the combustion efficiency of the roller kiln. In addition, the fuel gas and the combustion-supporting air are under the fully automatic interlocking control, which can automatically adjust the flow rate of the fuel gas according to the kiln temperature to maintain the kiln temperature constant. A solenoid valve is installed between the premixer and a burner. When the temperature of the combustion zone reaches an upper limit, a passage of the air-fuel mixture of the fuel gas and hot air entering the kiln can be cut off at any time, so that the fuel gas is shut off and the combustion-supporting air is also shut off, the kiln temperature can be maintained for a long time, saving a lot of fuel.

It should be noted that an objective of this application is to remedy the deficiencies existing in the conventional ceramic roller kilns, for example, the conventional biomass gas has a low calorific value, which is difficult to meet the requirements of the ceramic roller kiln combustion; the ceramic roller kiln fails to be shut down for a long time, the natural gas burner of the kiln is inconvenient to be replaced; and the utilization rate of the waste heat in the ceramic roller kiln is generally low.

In this embodiment, the liquid pentane at the ambient temperature is gasified into gaseous pentane by the waste heat generated by part of the 450° C.-flue gas discharged from the ceramic roller kiln provided herein. The gaseous pentane is fully mixed with the biomass gas to form fuel gas. The calorific value of pentane is much higher than that of natural gas, which compensates for the deficiency caused by the low calorific value of biomass gas to make the calorific value of the fuel gas consistent with that of natural gas, such that the biomass gas can be used without needing to replace the existing natural burner, and the long-term shutdown of the ceramic roller kiln is not required, thereby reducing the cost of renovation. In addition, the liquid pentane is generally gasified by electric heaters, which is expensive. In this application, the liquid pentane is heated and gasified into the gaseous pentane by using the waste heat generated by part of the flue gas discharged from the ceramic roller kiln, which greatly save a large amount of valuable electric energy. However, the premise is that this technology must be applied to the ceramic roller kiln, such that the waste heat of the 450° C.-gas discharged from the ceramic roller kiln can be used for free. 450° C. is the most suitable temperature for pentane gasification. If the heating temperature is too high, the liquid pentane near the heating pipe will be carbonized and coked. If the heating temperature is too low, the gaseous pentane produced per unit time will be too little, which is difficult to meet the large-scale production requirements of ceramic kilns. In addition, since the calorific value of the mixture of gaseous pentane and biomass gas can reach the calorific value of natural gas, hundreds of natural burners used in the ceramic roller kiln do not need to be replaced (the combustion pipeline system in the ceramic roller kiln also does not need to be replaced, which makes the replacement of the natural gas by the biomass gas possible. It is impossible for the ceramic roller kiln to be shut down for a long time during operation for replacement of the fuel burner and pipelines. The ceramic roller kiln will only be shut down for about 20 days before and after the Chinese's spring Festival for maintenance, such that it is unlikely to perform long-term shutdown and modification of the ceramic roller kiln.), which also ensures that cheap biomass gas can be successfully used in ceramic roller kilns. Moreover, the utilization rate of the waste heat of the ceramic kiln is generally low, and the high-temperature flue gas and hot air discharged from the kiln are only used to dry the brick embryos. However, the heat of the flue gas and hot air cannot be used up at all, and a large amount of waste heat is discharged from the chimney. In this application, the gradient utilization of the energy is used herein, and the waste heat is not only used for the ceramic roller kiln itself, but also used to provide heat source for the biomass gasifier. The 450° C. flue gas and the 260° C. hot air are both fed to the biomass gasifier as gasification agents, which can greatly improve the gasification efficiency of the gasifier. According to the field test data, the gasification efficiency of the ceramic roller kiln provided herein can reach more than 70%, while the gasification efficiency of ordinary biomass gasifier is only about 60%. Since the gasification agent uses high-temperature flue gas and hot air, the gas temperature at the gas outlet of the biomass gasifier reaches 200° C., which indirectly plays the role of preheating and reduces the energy consumption of the ceramic roller kiln. Then, the 450° C. flue gas is discharged from the ceramic roller kiln, such that the biomass gas is heated to above 350° C., thereby reducing the energy consumption of the ceramic roller kiln. It should be noted that 450° C. is the relatively suitable temperature for pentane gasification. Since the premixed combustion method is used herein, if the temperature of the flue gas is too high, the biomass gas may be heated to 500-600° C., which may catch fire in the premixer. The 450° C. flue gas is an inherent feature of the ceramic roller kiln, such that the biomass gas can only be heated to 350° C. Therefore, the premixed combustion method of dual preheating of the fuel gas and the combustion-supporting air can only be used in ceramic roller kilns without causing safety problems. Moreover, the original natural burner and combustion pipeline do not need to be replaced, so that the biomass gas can be successfully used in ceramic roller kilns.

It should be noted that currently, the utilization grade of the waste heat of ceramic kilns is very low, and the discharged flue gas and hot air are only used to dry the brick embryos. However, the heat of the flue gas and hot air cannot be used up at all (no biomass gasifier uses the heat), and a large amount of waste heat is discharged from the chimney. In this application, a biomass gasifier is installed, such that a large amount of waste heat can be used for heating of the biomass gasifier to improve the gasification efficiency. Since pentane is used herein, a large amount of heat is required to heat the pentane, such that the waste heat of the ceramic roller kiln can be further utilized. In addition, due to low calorific value, biomass gas must be preheated (while natural gas does not need to be preheated due to its high calorific value), which can fully use the waste heat of the ceramic roller kiln, so as to greatly improve the energy utilization efficiency. However, since the original ceramic roller kiln is not installed with biomass gasifier, and the biomass gas and pentane are not used, a large amount of the waste heat are wasted in vain, leading to low utilization rate of energy.

In some embodiments, pipes connected to the premixer are each provided with a fire arrestor for preventing backfire. The fire arrestor has an impeller structure. The impeller structure includes a blade mounting bracket and a plurality of blades. The plurality of blades are arranged evenly spaced apart on the blade mounting bracket along a circumferential direction. Each of the plurality of blades is inclined with respect to a surface of the blade mounting bracket. The plurality of blades each have a plurality of holes. There is no gap between vertical projections of adjacent blades. In this embodiment, since a fan generates a pushing force, the fuel gas can forward pass through the plurality of blades. When flashback occurs, since no pushing force exists, the paths of the fuel gas and the flame are blocked by the blades and cannot be propagated backwards, which effectively prevents the backfire. In addition, each of the plurality blades is provided with a plurality of holes of 2 mm, which effectively reduces the flow resistance. Due to the large resistance of the plurality of holes, the backfire can be prevented in the absence of pushing force.

In some embodiments, the heat exchanger is a jet-flow heat exchanger. The jet-flow heat exchanger has two pipelines staggered with each other. One of the two pipelines is configured for feeding of biomass gas to be heated, and has an inner pipeline and an outer pipeline. The inner pipeline and the outer pipeline are arranged concentrically. The other of the two pipelines is configured for feeding of recovered flue gas. The biomass gas to be heated enters the inner pipeline, and passes through a plurality of holes provided on the inner pipeline to be in contact with an inner surface of the outer pipeline. The recovered flue gas passes through the outer pipeline to heat the biomass gas to be heated by heat transfer. In this embodiment, the biomass gas enters the inner pipeline of the heat exchanger and impacts the inner surface of outer pipeline at a high speed through the plurality of holes on the inner pipeline, and exchanges heat with the high-temperature flue gas flowing through an outer surface of the outer pipeline to obtain high-temperature fuel gas. Considering that the biomass gas impacts at the high speed, the outer pipeline (made of stainless steel) is fully cooled without being damaged, and the biomass gas at 200° C. can be heated to 350° C.

In some embodiments, pentane gasification device is provided with a pentane heater. The pentane heater includes a gas feed pipeline and a liquid pentane storage vessel. The liquid pentane storage vessel is configured to store the liquid pentane. The liquid pentane storage vessel is provided with an outlet. The gas feed pipe includes a plurality of branches extending into the liquid pentane storage vessel. The gas feed pipe is configured to feed the second part of the flue gas discharged from the preheating section to gasify the liquid pentane to obtain the gaseous pentane, and carry the gaseous pentane to the premixer. In this embodiment, ordinary pentane gasification is generally realized via an electric heater, where the pentane is gasified into high-pressure gas and discharged. The electric heater is a pressure vessel, which has potential safety hazards, such that the electric heater is difficult to be widely used. In this application, a high-pressure fan is configured to transport 260° C. hot air into liquid pentane storage vessel to gasify the liquid pentane based on the principle of bubble atomization. The gaseous pentane is carried into the fuel manifold (no pressure is generated in the fuel manifold) by the flue gas for mixing with biomass gas to form a fuel, whose calorific value is the same as that of the natural gas, such that it does not need to replace the burners.

In an embodiment, the biomass combustion system further includes a control system. The roller kiln is provided with a temperature feedback system. The temperature feedback system is configured to collect temperature in the roller kiln, and feed temperature information to the control system. The control system is configured to control supplies of the hot air discharged from the cooling section and the feeding amount of biomass gas transported by the fuel manifold according to the temperature information fed back by the temperature feedback system. In this embodiment, the fuel gas and the combustion-supporting air are under fully automatic interlocking control, such that when the fuel gas is shut off, the combustion-supporting air is shut off, which not only enables the prolonged heat preservation inside the kiln and reduces the fuel consumption, but also can automatically adjust the flow rate of the fuel gas according to the kiln temperature to maintain the kiln temperature constant, thereby improving the thermal efficiency. When the kiln temperature is higher than a specified value, the feeding of the fuel gas and air flow is reduced, and when the kiln temperature is lower than the specified value, the feeding of fuel gas and air flow is increased.

In some embodiments, the fuel gas main distribution pipe is provided at downstream of the premixer along a gas flow direction. An end of the fuel gas main distribution pipe is provided with the plurality of burners. The premixer is configured to mix the hot air discharged from the cooling section with the biomass gas and the gaseous pentane transported by the fuel manifold to obtain the air-fuel mixture, and distribute the air-fuel mixture to the fuel gas main distribution pipe at the two sides of the roller kiln, and lead the air-fuel mixture to the plurality of burners. In this embodiment, a method integrating zoned centralized premixing and quantitative measurement is adopted. Each combustion zone is provided with a premixer to fully mix the fuel gas and hot air, and then the mixture is distributed to the fuel gas main distribution pipe at the two sides of the roller kiln, and introduced to the plurality of burners. The fuel gas pipe and the hot air pipe are each provided with an electric gas damper to accurately adjust the flow rate. Regardless of the rate of the gas flow entering the burner, the air-fuel ratio remains unchanged, completely eliminating the oxygen deficiency and oxygen excess, and greatly improving the combustion efficiency of the roller kiln.

It should be noted that the current ceramic kiln adopts the diffusion combustion method. In the diffusion combustion method, a large amount of combustion-supporting air is required, and the distribution of flow through each burner is uneven, which not only causes the entry of a large amount of the cold air, such that the heat is taken and the fuel is wasted. In addition, it is difficult to adjust the oxygen through the burners, such that some burners have deficient oxygen, and some have rich oxygen, leading to high energy consumption. The premixed combustion method should be used for improvement. In addition, when the kiln temperature reaches a preset value, the fuel gas is shut off, while the combustion-supporting air is not shut off, such that a large amount of cold air enters the kiln to rapidly cool the kiln, and then the burner will soon start again, wasting fuel. The fuel gas and combustion-supporting air should be automatically interlocked. When the fuel gas is shut off, the combustion-supporting air is also shut off, so as to maintain the kiln temperature for a long time to save fuel.

It should be understood that since the ceramic roller kiln has a very long body, and more than 20 combustion zones. Each combustion zone has a different temperature, such that the fuel gas volume and the air volume required by each combustion zone are different. But the premixing ratio of air to fuel gas required in each combustion zone is similar. Therefore, the zoned centralized premixing control method must be adopted. Each combustion zone is centrally provided with a premixer to fully mix the fuel gas and the hot air to obtain a mixture. The mixture is distributed to the fuel gas main distribution pipe at two sides of the roller kiln, and then introduced to each burner on the fuel gas main distribution pipe. The fuel gas pipe and the hot air pipe are each provided with an electric gas damper to accurately adjust the flow rate. Regardless of the rate of the gas flow entering the burner, the air-fuel ratio remains unchanged, completely eliminating the oxygen deficiency and oxygen excess, and greatly improving the combustion efficiency of the roller kiln. In addition, the fuel gas and the combustion-supporting air are under fully automatic interlocking control, such that when the fuel gas is shut off, the combustion-supporting air is shut off, which not only enables the prolonged heat preservation inside the kiln and reduces the fuel consumption, but also can automatically adjust the flow rate of the fuel gas according to the kiln temperature to maintain the kiln temperature constant, thereby improving the thermal efficiency.

In some embodiments, a second pipe between the cooling section and the premixer is provided with a first solenoid valve. The fuel manifold is connected to the premixer through a third pipe, and the third pipe is provided with a second solenoid valve. The fuel gas main distribution pipe is provided with a third solenoid valve.

In some embodiments, the pentane gasification device is connected to a first chimney, and the first chimney is configured to allow the flue gas to be discharged from the pentane gasification device. The heat exchanger is connected to a second chimney, and the second chimney is configured to allow the second part of the flue gas to be discharged from the heat exchanger. An exhaust fan is provided at an exhaust straight pipe of the preheating section of the roller kiln. The exhaust fan is configured to provide power for discharging the flue gas from the preheating section of the roller kiln.

Provided herein is a gasification and hybrid combustion method of biomass and pentane, which is performed through the following steps.

A biomass gas generated by the biomass gasifier is heated to from a first temperature to a second temperature.

The liquid pentane is heated into the gaseous pentane.

The gaseous pentane and heated biomass gas are premixed, followed by distribution to feed the combustion section.

In some embodiments, the third part of the flue gas discharged from the preheating section is recovered to the first gas inlet. The first part of the hot air discharged from the cooling section is recovered to the second gas inlet to be used as combustion-supporting air. The biomass gas is heated by the second part of the flue gas discharged from the preheating section from the first temperature to the second temperature. And the liquid pentane is heated by the first part of the flue gas into the gaseous pentane. In this embodiment, the combustion-supporting method using hot air is adopted, and the hot air at 260° C. or higher discharged from the cooling section is used as the combustion-supporting air. Compared with the ordinary kiln using cold air to support the combustion, the method used herein has saved a large amount of energy.

Compared with the prior art, this application has the following beneficial effects.

The multi-stage waste heat recovery and utilization technology is adopted herein. The biomass gas is heated to 350° C. by using the waste heat of part of the flue gas discharged from the ceramic roller kiln. The liquid pentane is heated and gasified into gaseous pentane by the waste heat of part of flue gas discharged from the ceramic roller kiln. The gaseous pentane and the biomass are uniformly mixed in the fuel manifold to obtain a fuel gas, and the fuel gas is fed to the ceramic roller kiln for combustion, which improves the energy utilization rate. Since the calorific value of pentane is much higher than that of natural gas, the calorific value of the fuel gas is close to that of natural gas, which effectively overcomes the insufficiency of low calorific value of biomass gas, and greatly reduces the operating cost of the ceramic roller kiln (the biomass gas and pentane are much lower than natural gas in price).

The waste heat utilization of ceramic roller kiln is combined with the biomass gasification technology. The 450° C. high-temperature low-oxygen flue gas discharged from the ceramic roller kiln and the 260° C. hot air are together used as the gasification agent for biomass gasification. Compared with ordinary biomass gasifiers that use cold air as the gasification agent, the biomass gasifier used herein has higher gasification efficiency, and low $NO_x$ emission. The temperature of the biomass at the outlet of the biomass gasifier can reach 200° C. The biomass gas has high temperature and high calorific value, which is energy-saving and environmentally friendly.

In this disclosure, the terms such as "one embodiment", "some embodiments", "example", "specific example", or "some examples", etc., mean that the specific feature, structure, material or feature described with reference to the embodiment or example is included in at least one embodiment or example of this application. In this disclosure, the exemplary description of the above-mentioned terms are not necessarily directed to the same embodiment or example. Moreover, the specific features, structures, materials or characteristics may be appropriately combined in any one or more embodiments or examples. In addition, those skilled in the art may combine different embodiments or examples and the features of different embodiments or examples described in this disclosure in the case that there is no contradiction.

Described above are merely intended to illustrate the technical solutions of this application to enable those skilled in the art to understand and implement this application, which should not be construed as limitations of this application. It should be understood that any changes or modifications made by those skilled in the art without departing from the spirit of the application shall fall within the scope of the present application defined by the appended claims.

What is claimed is:

1. A biomass combustion system for a ceramic roller kiln, comprising:
   a roller kiln;
   a biomass gasifier;
   a pentane gasification device; and
   a fuel manifold;
   wherein the biomass gasifier is provided with a feed port, a first gas inlet, a second gas inlet and an gas outlet; the feed port is configured for feeding of biomass or biomass waste; and the gas outlet is connected to the fuel manifold through a heat exchanger;

the pentane gasification device is connected to the fuel manifold;

the roller kiln is provided with a preheating section, a combustion section and a cooling section; the fuel manifold is communicated with the combustion section through a first pipe, and the first pipe is provided with a premixer; the cooling section is connected to the premixer through a second pipe; a first part of hot air discharged from the cooling section is transported to the premixer, and a second part of the hot air discharged from the cooling section is transported to the second gas inlet; the hot air discharged from the cooling section has a temperature higher than ambient temperature; the premixer is configured to mix the first part of the hot air discharged from the cooling section with a mixture of biomass gas and gaseous pentane transported by the fuel manifold to obtain an air-fuel mixture, and feed the air-fuel mixture to the combustion section through a plurality of burners; a first part of flue gas discharged from the preheating section is configured to provide heat source for the heat exchanger; a second part of the flue gas is configured to gasify liquid pentane in the pentane gasification device; and a third part of the flue gas is transported to the first gas inlet.

2. The biomass combustion system of claim 1, wherein pipes connected to the premixer are each provided with a fire arrestor for preventing backfire; the fire arrestor has an impeller structure; the impeller structure comprises a blade mounting bracket and a plurality of blades; the plurality of blades are arranged evenly spaced apart on the blade mounting bracket along a circumferential direction; each of the plurality of blades is inclined with respect to a surface of the blade mounting bracket; the plurality of blades each have a plurality of holes; and there is no gap between vertical projections of adjacent blades.

3. The biomass combustion system of claim 1, wherein the heat exchanger is a jet-flow heat exchanger; the jet-flow heat exchanger has two pipelines staggered with each other; one of the two pipelines is configured for feeding of biomass gas to be heated, and has an inner pipeline and an outer pipeline; wherein the inner pipeline and the outer pipeline are arranged concentrically; the other of the two pipelines is configured for feeding of recovered flue gas; wherein the biomass gas to be heated enters the inner pipeline, and passes through a plurality of holes on the inner pipeline to be in contact with an inner surface of the outer pipeline; and the recovered flue gas passes through the outer pipeline to perform heat transfer to heat the biomass gas to be heated.

4. The biomass combustion system of claim 1, further comprising:

a control system;

wherein the roller kiln is provided with a temperature feedback system; the temperature feedback system is configured to collect a temperature in the roller kiln, and feed temperature information to the control system; the control system is configured to control supplies of the hot air discharged from the cooling section and biomass gas transported by the fuel manifold according to the temperature information fed back by the temperature feedback system.

5. The biomass combustion system of claim 1, wherein a fuel gas main distribution pipe is provided at downstream of the premixer along a gas flow direction, and an end of the fuel gas main distribution pipe is provided with the plurality of burners; and the premixer is also configured to distribute the air-fuel mixture to the fuel gas main distribution pipe, and lead the air-fuel mixture to the plurality of burners.

6. The biomass combustion system of claim 5, wherein the second pipe is provided with a first solenoid valve; the fuel manifold is connected to the premixer through a third pipe, and the third pipe is provided with a second solenoid valve; and the fuel gas main distribution pipe is provided with a third solenoid valve.

7. The biomass combustion system of claim 1, wherein the pentane gasification device is connected to a first chimney, and the first chimney is configured to allow the first part of the flue gas to be discharged from the pentane gasification device; and the heat exchanger is connected to a second chimney, and the second chimney is configured to allow the second part of the flue gas to be discharged from the heat exchanger.

8. A gasification and hybrid combustion method of biomass and pentane using the biomass combustion system of claim 1, comprising:

heating biomass gas generated by the biomass gasifier from a first temperature to a second temperature;

heating the liquid pentane into the gaseous pentane; and premixing the gaseous pentane with heated biomass gas, followed by distribution to the combustion section.

9. The gasification and hybrid combustion method of claim 8, further comprising:

recovering the third part of the flue gas discharged from the preheating section to the first gas inlet; and recovering the first part of the hot air discharged from the cooling section to the second gas inlet to be used as combustion-supporting air;

wherein the biomass gas is heated by the second part of the flue gas discharged from the preheating section from the first temperature to the second temperature; and the liquid pentane is heated by the first part of the flue gas into the gaseous pentane.

* * * * *